United States Patent [19]
Endou

[11] Patent Number: 5,277,161
[45] Date of Patent: Jan. 11, 1994

[54] ENGINE CONTROLLER

[75] Inventor: Kouji Endou, Toyota, Japan

[73] Assignee: Toyota Jidosha Kabushiki Kaisha, Toyota, Japan

[21] Appl. No.: 22,244

[22] Filed: Feb. 25, 1993

[30] Foreign Application Priority Data

Feb. 26, 1992 [JP] Japan .................. 4-039708

[51] Int. Cl.⁵ ............................................. F02P 5/15
[52] U.S. Cl. ................................. 123/417; 123/424
[58] Field of Search .............. 123/339, 414, 416, 417, 123/422, 423, 424

[56] References Cited

U.S. PATENT DOCUMENTS

| | | | |
|---|---|---|---|
| 4,351,297 | 9/1982 | Suematsu | 123/424 |
| 4,359,988 | 11/1982 | Matsubara | 123/424 |
| 4,416,234 | 11/1983 | Ikeura | 123/424 |
| 4,489,691 | 12/1984 | Ono et al. | 123/424 |
| 4,633,834 | 1/1987 | Takeuchi et al. | 123/424 |
| 4,844,034 | 7/1989 | Honjo et al. | 123/424 |
| 4,982,712 | 1/1991 | Abe | 123/424 |
| 5,048,486 | 9/1991 | Okuda et al. | 123/424 |

FOREIGN PATENT DOCUMENTS

62-135666 6/1987 Japan .
1-195951 8/1989 Japan .

Primary Examiner—Willis R. Wolfe
Attorney, Agent, or Firm—Kenyon & Kenyon

[57] ABSTRACT

An engine controller comprises a detector for detecting whether a throttle valve has closed an intake passage, a determination device for determining whether the engine is in an idling condition, when a predetermined delay period (tKLLDLY) has elapsed from the detection of the closure of the intake passage, and a control device for controlling the ignition timings in response to the engine operation conditions. The controller further comprises a detector for detecting when the engine is operating, and a setting device for setting the delay period (tKLLDLY) from the detection of the start of the engine operation. The controller prevents the engine from causing a tapping noise, when the engine is operating.

10 Claims, 6 Drawing Sheets

ENGINE CONTROLLER

BACKGROUND OF THE INVENTION

1. Field of the Invention

The present invention generally relates to a vehicular engine. More particularly, the present invention relates to an engine controller for performing ignition timings and similar controls.

2. Description of the Related Art

The Japanese Unexamined Patent Publication 1-195951 discloses a conventional engine control device, which controls the ignition timings and fuel injections. In this conventional control device, the characteristics of the ignition timing control and the fuel injection control, while the engine is idling, differ from those during the engine non-idling operation. This control device determines whether the engine is in the idling condition, based on a signal transmitted from a throttle sensor. The throttle sensor is disposed along an intake passage, for detecting the opening angle of the throttle valve. The throttle sensor outputs the signal indicative of the opening angle amount of the throttle valve, and an idling signal reflective of the state of an idling contact switch, which generates an idling signal. The idling contact switch is ON when the throttle valve fully closes the intake passage, otherwise this switch is OFF.

The ignition timing of this control device is set in the more advance angle side, for reflecting the high output power of the engine, during the non-idling state or condition. When the engine is in the idling condition, the ignition timing is set in the more delay angle side, reflecting stability of the idling condition. When the engine speed exceeds a predetermined value during the idling state, fuel supply to the engine is interrupted.

The control device determines that the engine is in the idling condition, after a delay period has elapsed from the time the idling signal has switched from the OFF state to the ON state. The reasons for the delay period, on detecting the idling condition, are to delay (1) the ignition timing, and (2) the fuel supply interrupting more than when the throttle valve fully closes the intake passage. As a result, its delaying moderates the changes in the engine torque and air-fuel ratio. Such control prevents reductions of drivability because of torque shock, and of the exhaust emission resulting from a change of the air-fuel ratio.

Furthermore, in this conventional device, the delay period for determining the idling condition, in relation to the ignition timing control, is relatively shorter than the corresponding delay period related to the fuel injection control. Setting this delay period compensates for the difference between the actual air intake volume when the throttle valve fully closes the intake passage, and the apparent air intake volume, so as to prevent the ignition timing from being controlled in excessive advance angle.

However, when the engine is not actuated for some time, most of the lubrication oil, which is usually supplied to every part of the engine, generally drops into an oil pan. Consequently, the oil would not lubricate every part of the engine. As a result, the pistons and connecting rods might generate tapping noise, because of the lack of lubricating oil. Noise tends to occur more often, and becomes louder, as the combustion pressure increases, in other words, as the engine torque becomes larger. Therefore, one drawback of the conventional control device is the generation of noise when the engine is operational, since the detection of the idling condition is delayed.

The following illustrative example is given for further classification of the foregoing drawback. If an engine were provided with a throttle opener for preventing the fully closed throttle valve from adhering to a bore wall of the intake passage, when the engine is not actuated, the throttle opener keeps the throttle valve at a slightly opened (or shifted) position, in comparison with the fully closed position. Further when the engine is actuated, the throttles opener causes the throttle valve to switch to the fully closed position from the slightly opened position, under negative pressure.

Consequently, the throttle sensor causes the idling signal to switch from the OFF state to the ON state, simultaneously with the engine activation. Thereafter, the control device determines that the engine is in the idling condition, when a predetermined delay period has elapsed, subsequent to the switching of the idling signal to the ON stage.

Therefore, the ignition timing is to be advanced by the duration length of the delay period, and thereafter delaying. While the ignition timing is advanced by the delay period, the engine torque continuously increases. Therefore, if lubricating oil is not adequately supplied while the engine is actuated, loud noise is generated.

To resolve such problems, two attempted solutions were proposed. The first proposed solution is to use the ignition timing, which is set in the delay angle side specially for idling, regardless of the idling signals, even while the engine is operating. However, some drivers tend to operate the engine with the throttle valve open. Thus, this first solution would not solve the foregoing problems completely. The second proposed solution is to shorten the delay period uniformly at the idling determination time. However, this adversely affect the drivability and the exhaust emission, during the engine running.

SUMMARY OF THE INVENTION

Accordingly, an object of the present invention is to overcome the foregoing drawbacks, which were not adequate resolved by conventional devices. In other words, it is a primary object of the present invention to provide an engine controller, which provides sufficient drivability and cleaner exhaust emission, and which generates minimal tapping noise while the engine is operational.

To achieve the foregoing and other objects and in accordance with the purpose of the present invention, an improved engine controller is provided. The engine includes a throttle valve disposed along an intake passage. The controller includes a closure detector, an idling determination device, and an ignition control device.

The closure detector detects whether the throttle valve has closed the intake passage, and generates a signal identificative of such closure. The idling determination device determines whether the engine is in an idling condition, after a predetermined delay period (tKLLDLY) from the generation of the closure identificative signal.

The ignition control device controls the ignition timings in response to the engine operation conditions. In other words, the ignition control device executes an ignition timing control operation for the idling condition, which differs from that for a non-idling condition, in the case that the idling determination device has identified the engine is in the idling condition.

The controller further comprises an operation detector and a setting device. The operation detector detects when the engine is operating, and generates a detection signal reflective of the start of operation of the engine. The setting device sets the delay period (tKLLDLY) to a first delay value during a predetermined elapsed period of time from the generation of the start of operation signal. The setting device further sets the delay period (tKLLDLY) to a second delay value subsequent to the predetermined elapsed period of time, such that the first delay period is smaller than the second delay period.

BRIEF DESCRIPTION OF THE DRAWINGS

The features of the present invention that are believed to be novel are set forth with particularity in the appended claims. The invention, together with the objects and advantages thereof, may best be understood by reference to the following description of the preferred embodiments, together with the accompanying drawings, in which FIGS. 1 through 8 illustrate an embodiment according to the present invention:

DETAILED DESCRIPTION OF THE PREFERRED EMBODIMENT

A preferred embodiment of a controller, for use in a vehicular engine, will now be described referring to the drawings.

Figure 1:
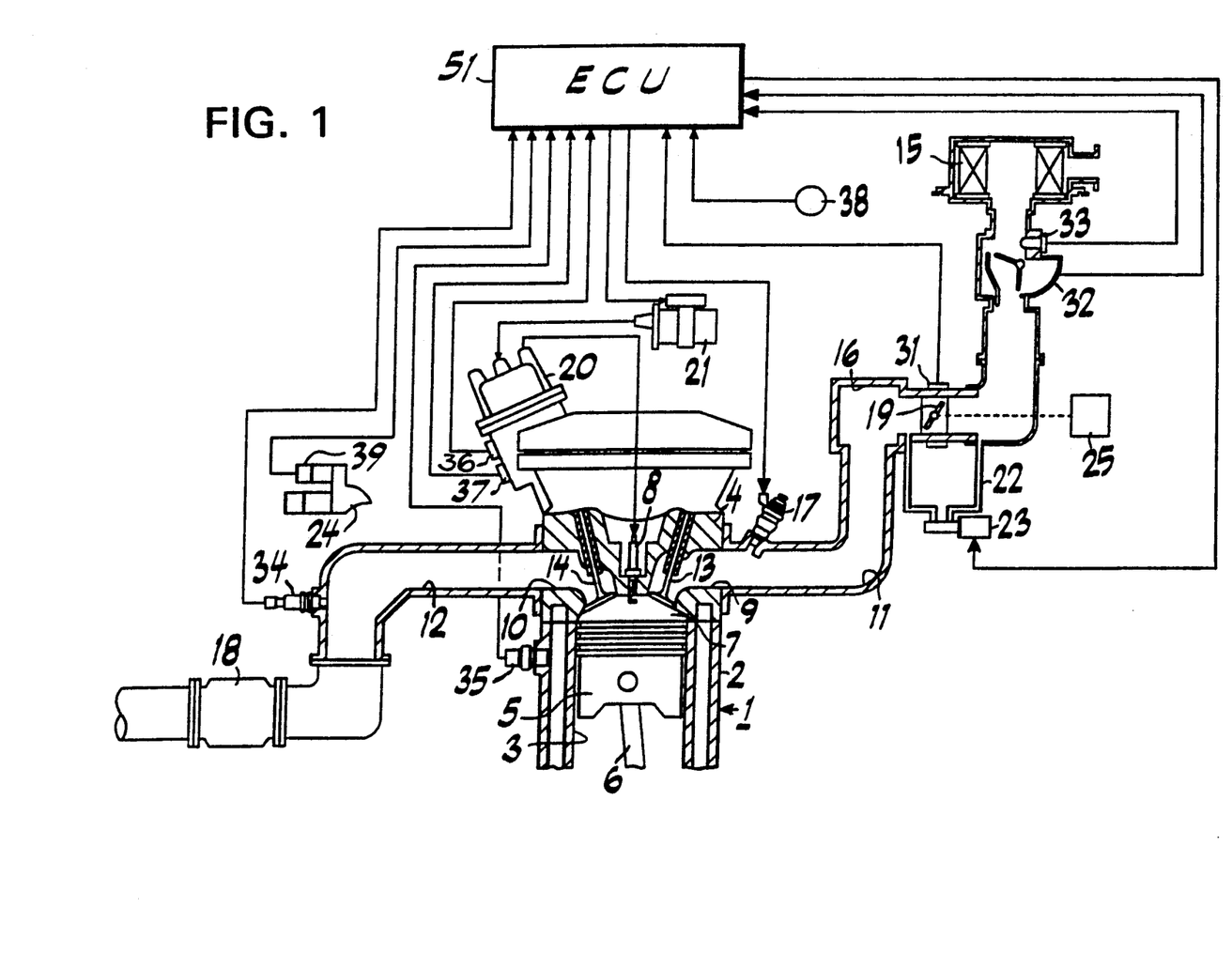
FIG. 1 is a schematic plan view illustrating an engine controller.

As shown in FIG. 1, an engine 1 includes a cylinder block 2 provided with a plurality of cylinder bores 3 (only one bore is shown). A cylinder head 4 is secured to the upper portion of the cylinder block 2, in order to cover the cylinder bores 3. Each cylinder bore 3 has a piston 5, which reciprocates vertically within the associate bore 3. Each piston 5 is joined to a crank shaft (not shown), via a corresponding connecting rod 6. A combustion chamber 7 is defined between the piston 5 and the cylinder head 4, within the corresponding cylinder bore 3. When the engine 1 is running, lubricant oil, which is stored in an oil pan (not shown), is supplied to every inner peripheral surface of the cylinder bores 3 and the connecting rods 6.

A plurality of ignition plugs 8 are provided in the cylinder head 4. Each ignition plug 8 corresponds to a corresponding chamber 7. A suction port 9 and an exhaust port 10, communicate with each corresponding combustion chamber 7, are provided in the cylinder head 4. Each suction port 9 communicates with an air-intake passage 11, and each exhaust port 10 communicates with an exhaust passage 12. A suction valve 13 is provided in the suction port 9, and controls the communication between the chamber 7 and the passage 11. Similarly, an exhaust valve 14 is provided in the exhaust port 10, and controls the communication between the chamber 7 and the passage 12. These valves 13 and 14 are driven by means of a valve drive mechanism, which includes a cam shaft (not shown), in relation to the rotary movement of the crank shaft. Further, the opening and closing timings of the valves 13 and 14 are synchronous with the rotation of the crank shaft. In other words, they are synchronous with a sequence of strokes, such as a suction stroke, a compression stroke, a combustion stroke, an expansion stroke, and an exhaust stroke.

An air cleaner 15 is disposed on the inlet side of the air-intake passage 11. The passage 11 includes a surge tank 16 which is disposed midway along the passage 11, and a plurality of fuel injectors 17 which are provided at every port 9, downstream from the tank 16. The tank 16 eliminates the pulsation generated in the air steam flowing through the passage 11, so as to make the air stream flow smoothly. Fuel is supplied at a predetermined pressure to each injector 17, from a fuel tank 16, by means of a fuel pump. A three way catalytic converter 18 is disposed on the outlet side of the exhaust passage 12, for cleaning the exhaust gas.

Outside air is introduced, via the air cleaner 15 and the passage 11, to the engine cylinder. Fuel is injected from each one of the injectors 17, simultaneously with the air introduction. The fuel-air mixture is supplied to the chamber 7, in relation to the movement of the valve 13, during the suction stroke. This mixture is caused to be explosively burnt by a corresponding ignition plug 8. Then, the pistons 5 and the crank shaft are actuated so as to generate the drive power of the engine 1. The exhaust gas in the chamber 7 is led to the exhaust passage 12, in relation to the movement of the valve 14, during the exhaust stroke, and is discharged via the catalytic converter 18.

A throttle valve 19 is disposed upstream from the tank 16, and is connected to an accelerator pedal (not shown). The amount of air supplied through the passage 11 (that is, the intake Q) is adjusted according to an inclination angle of the throttle valve 19.

The engine control system according to this embodiment includes a throttle opener 25. The opener 25 prevents the throttle valve 19, which fully closes the passage 11, from being adhered to the inner wall of the passage 11, when the engine 1 is non operational. The opener 25 keeps the valve 19 slightly opened, such that the valve 19 will not fully close the passage 11, when the engine 1 is to be stopped. Furthermore, the opener 25 causes the valve 19 to return to the position where it fully closes the passage 11 (hereinafter, referring as a fully closed position), under the negative pressure generated in the cylinder, simultaneously with the actuation (starting or the beginning of operation) of the engine 1.

This engine control system includes a throttle sensor 31, which is disposed in the vicinity of the throttle valve 19. The sensor 31 detects an opening angle of the valve 19 (hereinafter, referring to as throttle angle TA), and transmits a detection signal which corresponds to the value of the throttle angle TA. The sensor 31 includes an idling contact switch (not shown) which is activated, only when the valve 19 is in the fully closed position. Therefore, the sensor 31 transmits an idling signal (IDL) reflective of the ON or OFF state of the idling contact switch. When the engine 1 is operational, the idling signal IDL switches from the "OFF" state to the "ON" state, by means of the opener 25.

The air-intake passage 11 includes an air-flowmeter 32 and an air temperature sensor 33, which are disposed downstream from the air cleaner 15. The air-flowmeter 32 detects the intake volume Q of the air supplied to the passage 11. The sensor 33 detects the intake air temperature (THA). Furthermore, a by-pass path 22 is provided within the passage 11, and communicates with the upper and lower stream sides of the valve 19. The by-pass path 22 includes a linear type solenoid idling speed control valve (ISCV) 23, which is well known in the field.

The ISCV 23 regulates the opening of the by-pass path 22, based on the control signal from other device. The ISCV 23 stabilizes the idling, during the idling period when the valve 19 fully closes the passage 11. Therefore, the ISC control, which means the controls of the ISCV opening amount and the ISCV opening intervals during the idling period, enables the adjustment of the amount of air flow in the by-pass path 22, so as to regulate the amount of air supplied to the chamber 7 during the idling period.

An oxygen sensor 34 is provided midway along the exhaust passage 12, and detects the oxygen density, OX, in the exhaust gas, resulting in the detection of the air-fuel ratio. The cylinder block 2 has a coolant temperature sensor 35 for detecting the temperature of the cooling water (THW).

A distributor 20 distributes high voltage from an ignitor 21, as an ignition signal, to each one of the ignition plugs 8, in synchrony with the rotation of the crank shaft (i.e., according to crank angle). Each ignition plug 8 ignites, when if receives an ignition signal from the distributor 20. The ignition timing for each ignition plug 8 depends on the output timing of the high voltage from the ignitor 21.

The distributor 20 includes a rotor which is rotatable with the crank shaft, an engine speed sensor 36 and a timing sensor 37. The engine speed sensor 36 detects the number of revolutions per minute of the engine 1 (hereinafter, referred to as the engine speed NE), based on the number of revolutions of the rotor. The timing sensor 37 detects a crank angle standard signal (GP) by a predetermined interval, in relation to the rotation of the rotor. In this embodiment, while a sequence of strokes (suction, compression, combustion, expansion, and exhaust strokes) are carried out, the crank shaft rotates twice time. The engine speed sensor 36 detects or samples the crank angle (CA) at the rate of 30 degrees CA per pulse. On the other hand, the timing sensor 37 detects or samples the crank angle (CA) every 360 degrees CA per pulse.

Further, a vehicle speed sensor 38 is provided in a transmission mechanism (not shown) which is operatively connected to the engine 1, for detecting the vehicle speeds (SP). The engine includes a starting motor 24 for actuating the engine 1 by cranking. The starting motor 24 includes a starting motor switch 39, which switches its state either to the ON state or the OFF state, in accordance with the state of the ignition switch (not shown). In other words, the starting motor 24 is activated while the ignition switch is in the ON state. Further, the starting motor switch 39 transmits a starter signal (STS) which is in the ON state, while the motor 24 is operational.

Figure 2:
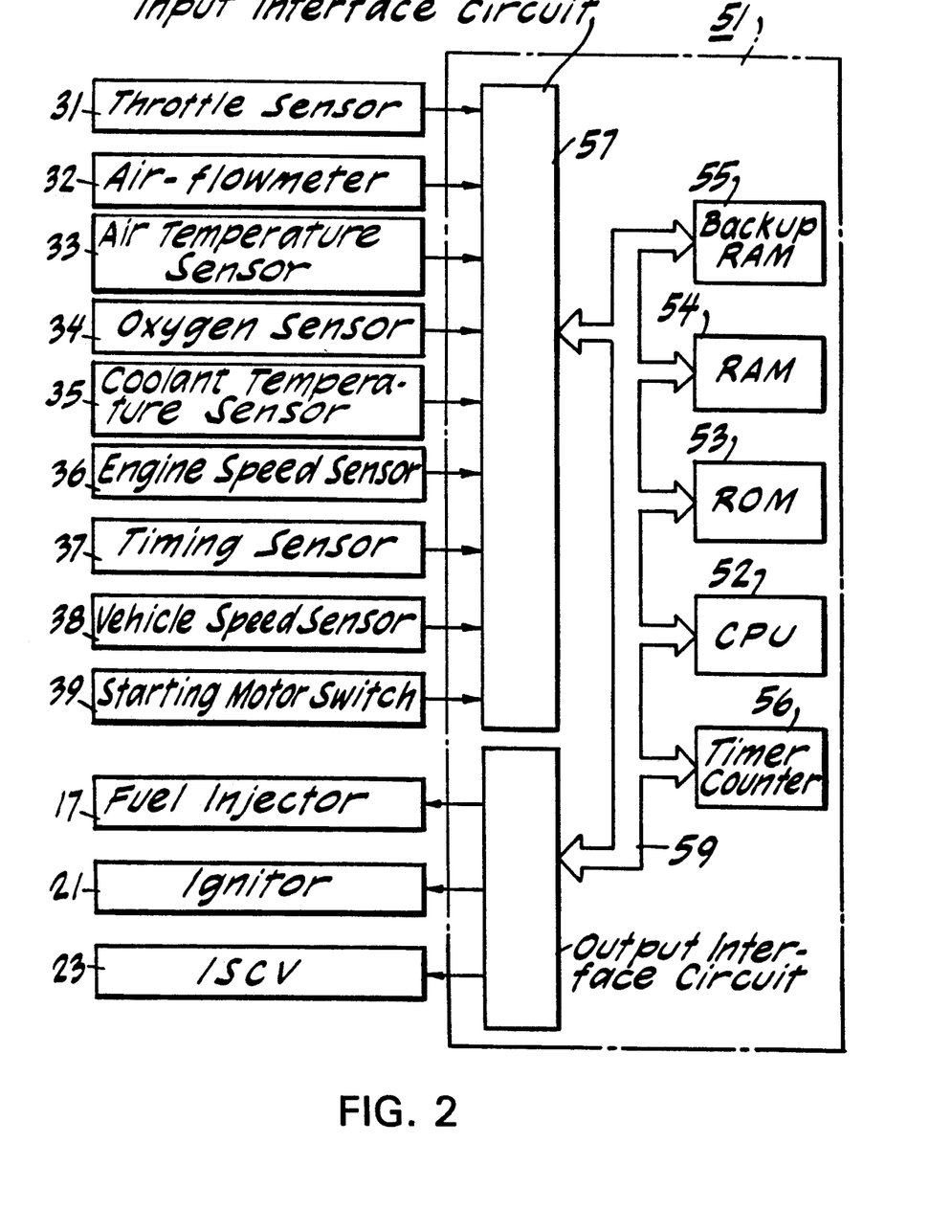
FIG. 2 is a block diagram illustrating an electronic control unit (ECU) and its peripheral devices.

The engine control system, according to this embodiment, includes an electronic control unit (ECU) 51 for integrally controlling the injectors 17, the ignitor 21 and the ISCV 23, integrally. As shown in FIG. 2, the ECU 51 includes a central processing unit (CPU) 52, a read only memory (ROM) 53, a random access memory (RAM) 54, a backup RAM 55, a timer counter 56, an input interface circuit 57, an output interface circuit 58, and data buses 59 which mutually connect between the circuits 57 and 58, and the units 52, 53, 54, 55, 56. The ROM 53 stores control programs (such as an idling determination routine and an ignition timing calculation routine, etc.), and a ignition timing map, which are described later. The RAM 54 temporarily stores a calculated result by the CPU 52, and the backup RAM 55 backs up the data to be stored in the RAM 54. The timer counter 56 periodically transmits an interruption request signal, and can further perform various kinds of simultaneous counting operations.

The output interface circuit 58 is connected to the injectors 17, the ignitor 21 and the ISCV 23. The input interface circuit 57 is connected to the throttle sensor 31, the air-flowmeter 32, the air temperature sensor 33, the oxygen sensor 34, the coolant temperature sensor 35, the engine speed sensor 36, the timing sensor 37, the vehicle speed sensor 38 and the starting motor switch 39. The CPU 52 properly controls the actuating timings of each injector 17, the ignitor 21 and the ISCV 23, based on the input data from each one of the sensors 31 through 38 and the switch 39.

The ignition timing control of an engine controller will now be described, referring to FIGS. 3 through 8.

When the ignition switch is turned on, the ECU 51 clears a set of control flags (such as an idling flag (XIDL), which will be described later), which are used for controlling the ignition timings. Thereafter, the ECU 51 repeatedly executes the control operations according to the idling determination routine and the ignition timing calculation routine, along with other controls, such as a fuel ignition control and an ISC control, etc.

The CPU 52 inputs the idling signal (IDL) from the throttle sensor 31, and the starter signal (STS) from the switch 39, synchronously with the interruption request signal, which is periodically transmitted from the timer counter 56. When the idling signal (IDL) is switched to the ON state, the CPU 52 activates the timer counter 56 to start counting, in order to measure the elapsed time (CLLDLY) since the throttle valve 19 has fully closed the air-intake passage 11. Hereinafter, the elapsed time is referred to as "elapsed time after fully closed (CLLDLY)". Further, when the starter signal (STS) is switched to the ON state, the CPU 52 activates the timer counter 56 to start counting, so as to measure the elapsed time (CAST) since the engine 1 started the operation was actuated. Hereinafter, the elapsed time will be referred to as "elapsed time after actuation (CAST)".

Figure 4:
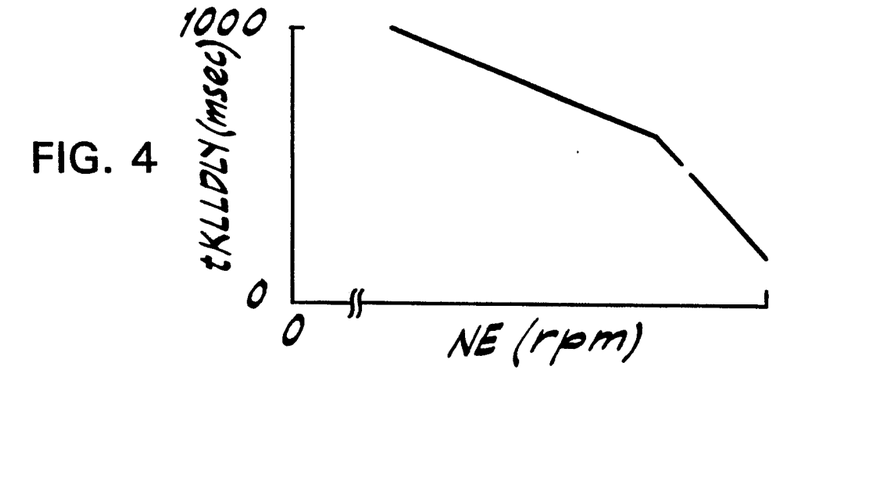
FIG. 4 is a graph illustrating the relationship between the engine speed (NE) and a delay period (tKLLDLY)

A flowchart shown in FIG. 4 illustrates an interruption routine relating to the idling determination. The CPU 52 periodically executes this routine.

Figure 3:
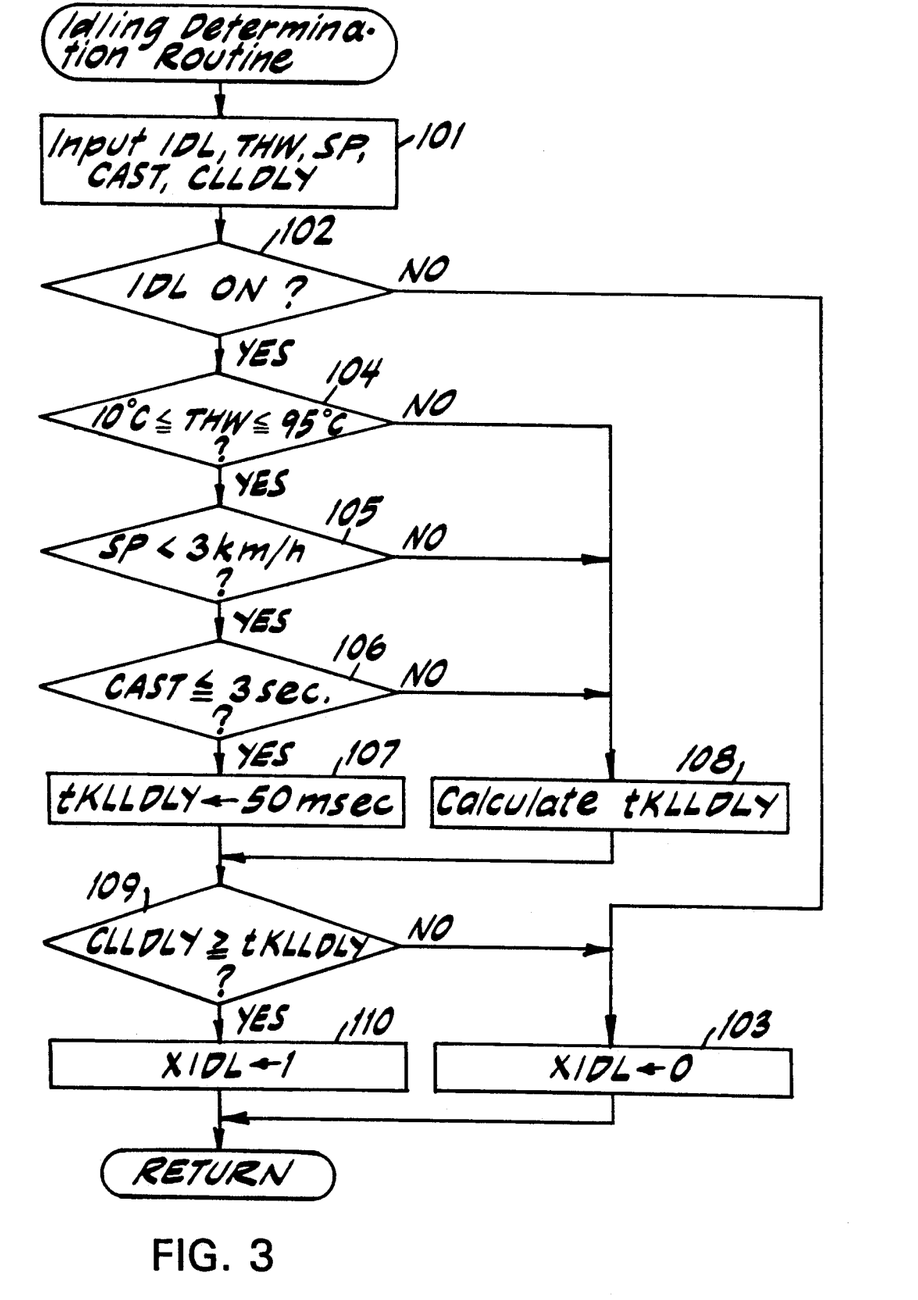
FIG. 3 is a flowchart illustrating an idling determination routine that is executed by the ECU of FIG. 2.

First, the CPU 52 inputs the idling signal (IDL), the data of the coolant temperature (THW), and the vehicle speed (SP), from the sensors 31, 35 and 38, respectively (step 101). Furthermore, the CPU 52 inputs the elapsed time after actuation (CAST) and the elapsed time after fully closed (CLLDLY), from the timer counter 56 (step 101). Then, the CPU 52 determines whether the idling signal (IDL) is in the ON state (step 102).

When the idling signal (IDL) is in the OFF state, the OFF state indicates that the engine 1 is not in the idling condition (in other words, the throttle valve 19 is opened). Therefore, the CPU 52 sets the idling flag (XIDL) to "zero" (step 103), and then terminates the interruption operation. On the contrary, when the idling signal (IDL) is in the ON state, at 102, the ON state indicates that the valve 19 has fully closed the air-intake passage 11. At this time, the CPU 52 makes the determinations in steps 104 through 106.

The CPU 52 determines whether or not the coolant temperature (THW) is in the range between 10° C. and 95° C. (step 104). If the coolant temperature is within this range, the engine 1 is in the preferred condition to be operated. Therefore, the engine 1 will not be affected by the coolant temperature on engine operation. When the coolant temperature (THW) is within the foregoing range, the CPU 52 determines whether or not the vehicle speed (SP) is less than 3 kilometer per hour (km/hr) (step 105). If the vehicle speed (SP) is less than 3 km/hr, this indicates that the velocity of the vehicle is close to zero. When the vehicle speed (SP) is less than 3 km/hr, the CPU 52 determines whether or not the elapsed time after actuation (CAST) is at most three seconds (step 106). In the case where the vehicle speed (SP) is less than 3 km/hr, and where the elapsed time (CAST) is at most three seconds, it indicates that the engine has been just actuated. When the elapsed time (CAST) is at most three seconds, the CPU 52 sets the delay period (tKLLDLY) to an extremely short value, i.e. 50 milliseconds (step 107). This delay period (tKLLDLY) is used for delaying the execution of the determination of the idling condition. Hereinafter, the delay period is referred as "determination delay period (tKLLDLY)".

In case of any one of the following conditions: the coolant temperature (THW) is not in the range between 10° C. and 95° C. at step 104; the vehicle speed (SP) is at least 3 km/hr at step 105; or the elapsed time after actuation (CAST) is above 3 seconds at step 106, the CPU 52 calculates the delay period (tKLLDLY), referring to the map of FIG. 4 (step 108). According to that map, the delay period (tKLLDLY) is determined as a function of the engine speed (NE). As the engine speed (NE) increases, the delay period (tKLLDLY) decreases. Further, in a low revolution region corresponding to the engine idling, the delay period (tKLLDLY) is set approximately to 1000 milliseconds, which is significantly longer than the time that was set in step 107.

After the delay period (tKLLDLY) is set, at step 107 or step 108, the CPU 52 determines whether or not the elapsed time after fully closed (CLLDLY) exceeds the determination delay period (tKLLDLY) (step 109). If the elapsed time (CLLDLY) is equal to, or exceeds the delay period (tKLLDLY), this indicates that time has elapsed by at least tKLLDLY, since the throttle valve 19 has fully closed the air-intake passage 11. In this case, the CPU 52 sets the idling flag (XIDL) to "1" (step 110), and terminates the interruption routine. If the elapsed time (CLLDLY) is less than the delay period (tKLLDLY), it indicates that period has not yet elapsed by tKLLDLY, since the valve 19 has fully closed the passage 11. In this case, the CPU 52 sets the idling flag (XIDL) to "zero" (step 103), and terminates the interruption routine.

In this way, the CPU 52 determines whether or not the engine is in the idling condition, based on the various information loaded therein, and writes the determination result as the idling flag (XIDL). Furthermore, the delay period (tKLLDLY), used while the engine is operating, is different from that in other periods. The delay period (tKLLDLY) during the operating of the engine is extremely short.

Consequently, the foregoing determination is executed almost immediately after the engine starts operating, and the idling flag (XIDL) is reset promptly. On the other hand, when the engine is not operational, the delay period (tKLLDLY) is set to be relatively long. Therefore, the foregoing determination of whether or not the engine is in the idling condition, is slightly delayed from the time the engine starts operating. Thereafter, the idling flag (XIDL) is reset.

Figure 5:
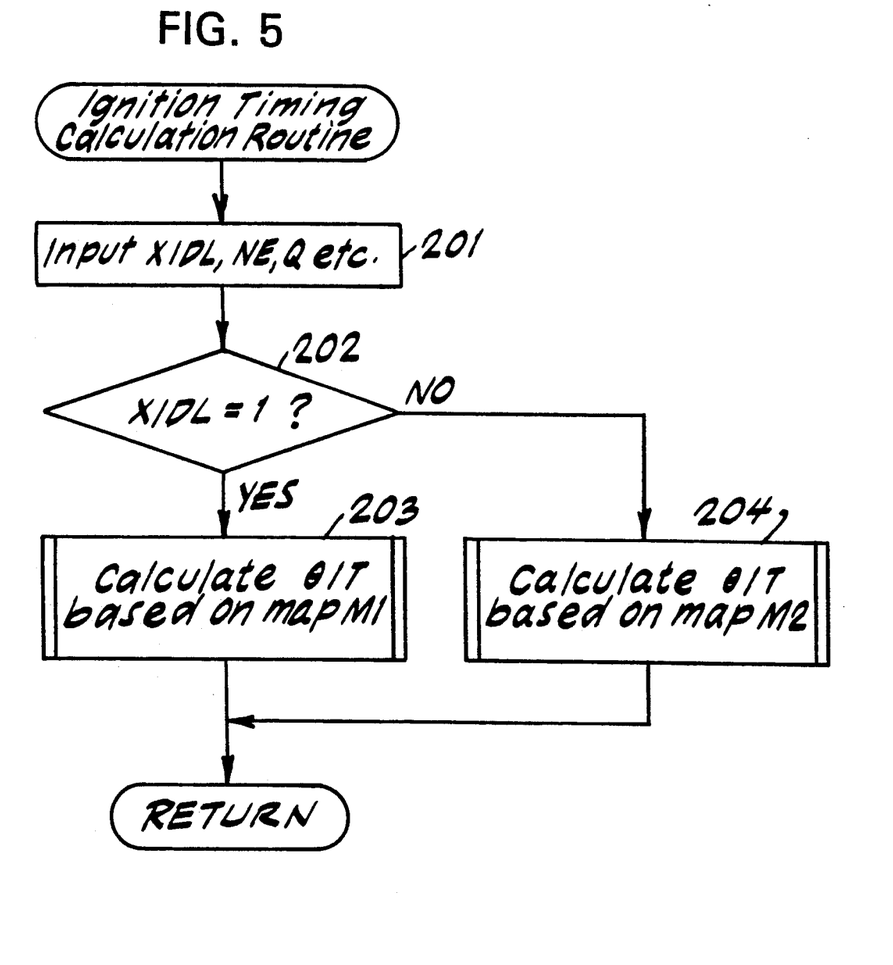
FIG. 5 is a flowchart illustrating an ignition timing calculation routine executed by the ECU of FIG. 2.

The flowchart shown in FIG. 5 illustrates an interruption routine relating to the ignition timing calculation. The CPU 52 periodically executes this routine.

The CPU 52 inputs the idling flag (XIDL) set in the idling determination routine (step 201). Further, the CPU 52 inputs data relating to the engine speed (NE) and to the intake amount (Q), from the engine speed sensor 36 and the air-flowmeter 32 (step 201). The CPU 52 determines whether or not the idling flag (XIDL) is set to "1" (step 202).

Figure 6:
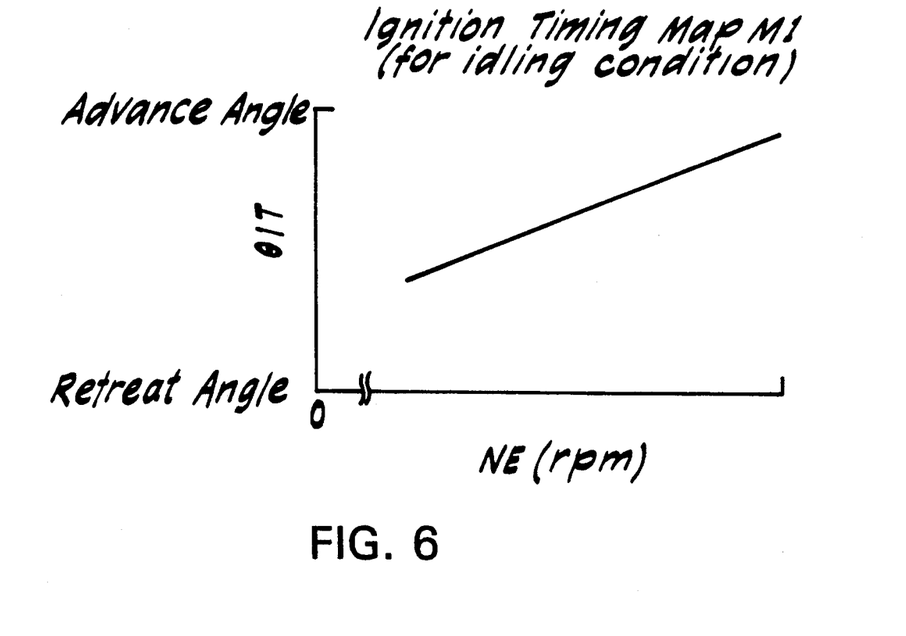
FIG. 6 is a graph illustrating the relationship between the engine speed (NE) and an ignition timing angle ($\theta$IT)

When the idling flag (XIDL) is set to "1" (at the idling condition), the CPU 52 calculates an ignition timing angle ($\theta$IT), referred to, in the map M1 of FIG. 6 (step 203). According to this map M1, the ignition timing angle ($\theta$IT) is defined as a function of the engine speed (NE). As the engine speed (NE) increases, the timing angle ($\theta$IT) is set in the advance angle side (i.e., set to a larger value). The whole of those timing angles ($\theta$IT) is usually set in the retreat angle side, where it would be advantageous to stabilize the engine idling.

Figure 7:
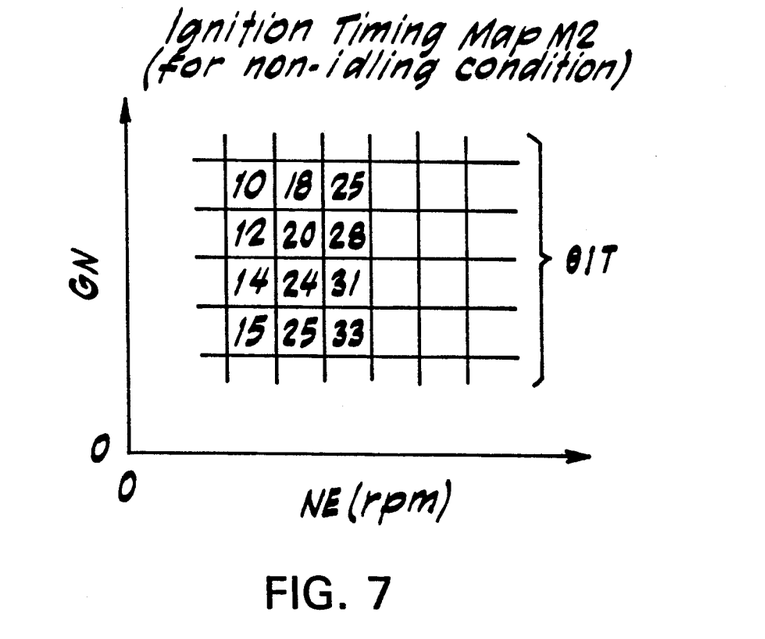
FIG. 7 is a tabular graph illustrating the relationship among the following elements: an engine speed (NE), a load value (GN), and the ignition timing angle ($\theta$IT)

On the other hand, when the idling flag (XIDL) is not set to "1", at step 202, the CPU 52 deems that the engine is not in the idling condition at that present time, and calculates the ignition timing angle ($\theta$IT), referring to the ignition timing map M2 of FIG. 7 (step 203). According to this map M2, the timing angle ($\theta$IT) is defined as a function of the engine speed (NE) and the load value (GN). The load value (GN) is defined as the ratio between the intake amount (Q) and the engine speed (NE), and corresponds to the intake amount of air, while the engine is making a single revolution. As the load value (GN) decreases, and/or as the engine speed (NE) increases, the ignition timing angle ($\theta$IT) is set in the advance angle side (i.e., set to a larger value). Further, the whole of these timing angles ($\theta$IT) in the map M2 is generally set in more advance angle side than that in the map M1, in view of increasing the engine output high.

In this way, the CPU 52 calculates the most preferred ignition timing angle ($\theta$IT), according to the engine conditions (that is, whether or not the engine is in the idling condition). The ECU 51 controls the ignitor 21, based on the calculated timing angle ($\theta$IT), for performing suitable ignition timing control.

Figure 8:
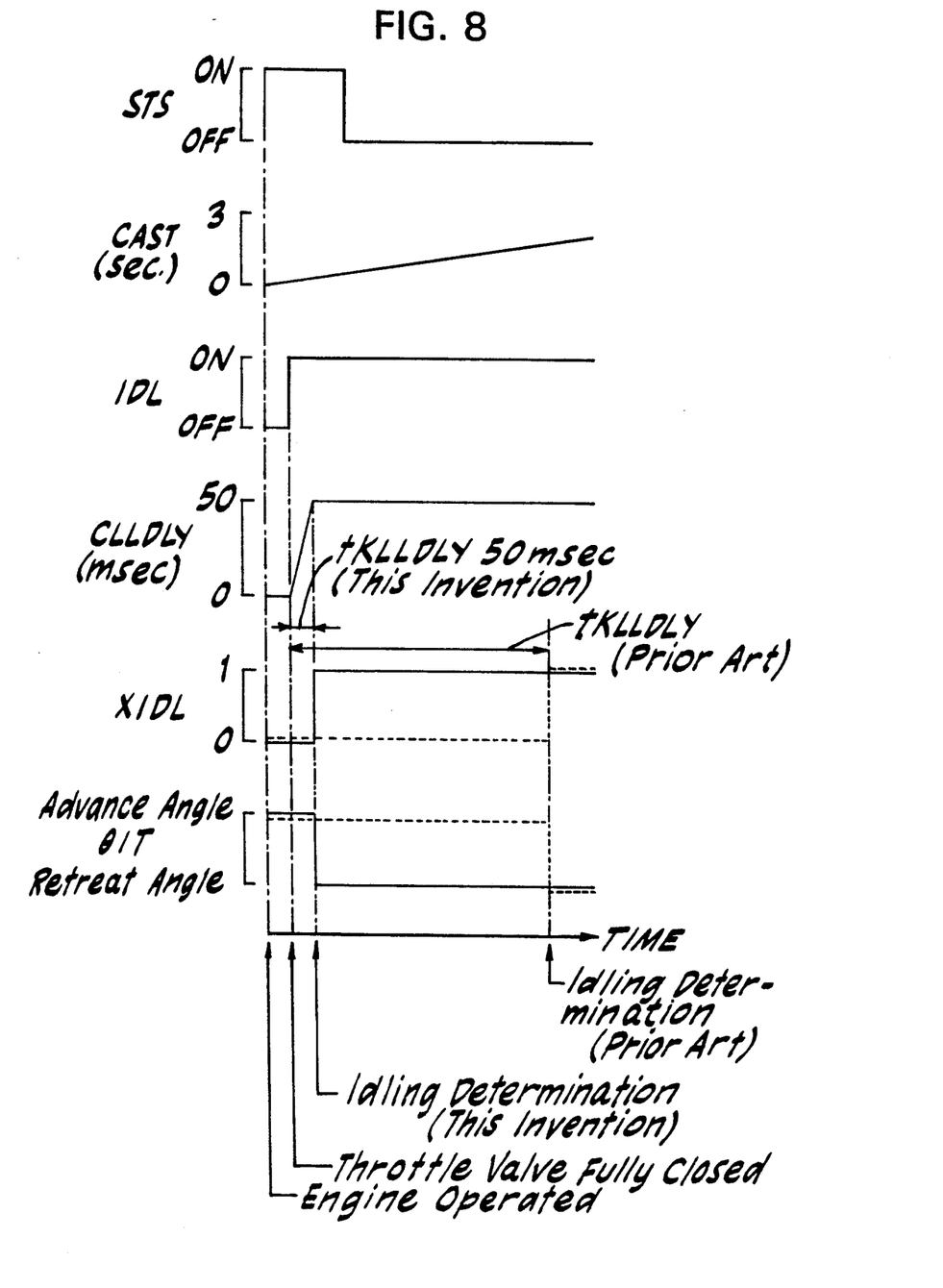
FIG. 8 is a timing chart illustrating the relationship between time and each of the following elements: starter signal (STS), elapsed time (CAST), idling signal ($\theta$DL), elapsed time (CLLDLY), idling flag (XIDL), and ignition timing angle ($\theta$IT).

The operation of the engine controller while the engine is operating, will now be described, referring to the timing chart of FIG. 8.

As the ignition switch is switched on, the engine starts operating, and the starter signal (STS) indicates the ON state. This ON state signal instructs the ECU 51 that the engine has started. The determination delay period (tKLLDLY) is set to an extremely short time, i.e. 50 msec after the STS has switched to the ON state, and before the three seconds of the elapsed time CAST have expired since the turning on of the STS. In this case, the throttle opener 25 causes the throttle valve 19 to fully close becomes a fully closed position, after the expiration of a slightly delayed timing with respect to the engine actuation. Therefore, the idling signal (IDL) is caused to switch from the "OFF" state to the "ON" state. The change of state of the signal (IDL) instructs the CPU 51 that the valve 19 has been fully closed.

After the signal (IDL) changes its state to "ON", the elapsed time after fully closed (CLLDLY) reaches the value (i.e. 50 msec) of the delay period (tKLLDLY), and the idling flag (XIDL) is caused to change its state from "zero" to "1". When the idling flag (XIDL) is set to "1", the idling flag (XIDL) informs the ECU 51 that the engine is in the idling condition.

The foregoing determination about the idling condition is applied when the engine is operational, and when the valve 19 is opened by the pedal thrusting action, regardless of the throttle opener 25. The setting of the ignition timing angle ($\theta$IT) is switched to the retreat angle side from the advance angle side, in response to that determination.

To the contrary, a conventional control device compared to the device according to the present embodiment, delays the resetting of the idling flag (XIDL) (i.e., determines whether or not the engine is in the idling condition). Therefore, in the conventional device, the re-setting of the ignition timing angle ($\theta$IT) is also delayed. Additionally, FIG. 8 illustrates the conventional device in broken lines.

According to the present embodiment, within the three seconds period, after the engine is started, the ECU 51 can promptly determine whether or not the engine is in the idling condition, due to the extreme short delay period (tKLLDLY). The ignition timing of the engine can be controlled, based on the ignition timing angle ($\theta$IT), which preferably fits the idling condition.

If the engine is operated when the lubricant oil is not yet supplied in sufficient quantity to the entire engine, the detection of the idling condition is delayed by the delay period (tKLLDLY), and the ignition timing angle ($\theta$IT) is set in the retreat angle side. According to the present embodiment, when the delay for determining the idling condition is extremely short, and the ignition timing angle ($\theta$IT) is promptly changed to a predetermined value in the retreat angle side. As a result, when the engine is operational, the engine torque is promptly reduced, and noise caused by the pistons 5 or the connecting rods 6 is reduced accordingly.

In the control device according to this embodiment, noise generation is significantly minimized only by resetting the determination delay period (tKLLDLY), when the engine is operating. One of the most advantageous features of the present invention is that there is no need to use any additional mechanisms for controlling noise generation. Furthermore, this control device promptly executes the ignition timing control immediately after the engine is started, based on the preferred ignition timing angle ($\theta$IT) for the idling condition. Therefore, the present invention can prevent or significantly reduce: (1) the grating noise by the engine drive mechanism; (2) generating knocking when the engine operates at high temperatures; and/or (3) occuring an abrupt abnormal increment of the engine speed while the engine is running.

The delay period (tKLLDLY) corresponding to the value of the engine speed (NE) is used, when the determination of the idling condition is executed after the engine has is operated. At that time, the ECU 51 can perform the ignition timing control which satisfies the demand for improving drivability and exhaust emission.

Furthermore, according to this embodiment, the ECU 51 promptly determines whether or not the engine is in the idling condition, within the three seconds since the engine was started. Therefore, while the engine is operational or running, the ECU 51 promptly performs the ISC control, whereby the ISCV 23 is used, based on the result of the idling. As a result, the engine idling condition is promptly stabilized immediately after the engine starts running. Similar to the ISC control, various controls, which are effected by the result of the idling determination, are executed almost immediately.

Although only one embodiment of the present invention has been described herein, it should be apparent to those skilled in the art that the present invention may be embodied in many other specific forms without departing from the spirit or scope of the invention. Particularly, it should be understood that following modifications may be applied.

The determination delay period (tKLLDLY) is not limited to 50 msec, but can be properly changed, so as to correspond to the type of the engine and its exhaust dimensions. The functions or graphs illustrated in FIGS. 4, 6 and 7, can be modified according to the engine type.

In the above described embodiment, the factors such as the coolant temperature (THW) or the vehicle speed (SP), are considered to determine the engine operational condition. However, the ranges between which these factors vary, could be changed for improved performance. Alternatively, these factors can be ignored for engine control.

Therefore, the present examples and embodiments are to be considered as illustrative and not restrictive, and the invention is not to be limited to the details giving herein, but may be modified within the scope of the appended claims.

What is claimed is:

1. A controller for an engine, the engine including a throttle valve disposed along an intake passage, and the engine operation changing between an idling condition and a non-idling condition, the controller comprising:
closure detection means for determining whether the throttle valve has closed the intake passage, and for generating a signal identificative of such closure;
idling determination means for identifying the idling condition of the engine, after a predetermined delay period (tKLLDLY) from the generation of said closure identificative signal, and for generating an idling signal indicative thereof;
ignition control means for controlling ignition timings in response to the engine operation conditions, said ignition control means performing either a first ignition timing control operation for the engine idling condition, or a second ignition timing control operation for the engine non-idling condition which is different from said first ignition timing control operation, and said ignition control means performing said first ignition timing control operation when said idling condition is identified by said idling determination means;

operation detecting means for determining when the engine is operating, and for generating a detection signal reflective of the start of operation of the engine; and setting means for setting said delay period (tKLLDLY) to a first delay value during a predetermined elapsed period of time from the generation of said start of operation signal, and for setting said delay period (tKLLDLY) to a second delay value subsequent to said predetermined elapsed period of time, whereby said first delay value is smaller than said second delay value.

2. The controller according to claim 1, wherein said idling determination means includes:

time measuring means for measuring a time period (CLLDLY) from the genaration of said closure identificative signal; and means for determining when said measured time period (CLLDLY) has elapsed relative to said delay period (tKLLDLY).

3. The controller according to claim 1, wherein said ignition control means includes:

memory means for storing a first ignition timing control program corresponding to the idling condition, and a second ignition timing control program coresponding to the non-idling condition; and means for executing either one of said first or said second ignition timing control programs, in response to said idling signal.

4. The controller according to claim 1, wherein said operation detection means includes a sensor for detecting the start of a starting motor.

5. The controller according to claim 1, wherein said setting means includes:

time measuring means for measuring a time period (CAST) from the generation of said start of operation signal;

means for determining whether said measured time period (CAST) has reached to said predetermined elapsed period; and means for setting said delay period (tKLLDLY) to a specific fixed value, when said measured time period (CAST) has not reached said predetermined elapsed period of time, and for setting said delay period (tKLLDLY) to a larger value than said specific fixed value, when said measured time period (CAST) has exceeded said predetermined elapsed period of time.

6. The controller according to claim 1, wherein said first delay value of said delay period (tKLLDLY) is about 50 milliseconds.

7. The controller according to claim 1, wherein said predetermined elapsed period of time is about three seconds.

8. A controller for an engine, the engine including a throttle valve disposed along an intake passage, and the engine operation changing between an idling condition and a non-idling condition, the controller comprising:

closure detection means for determining whether the throttle valve has closed the intake passage, and for generating a signal identificative of such closure;

first time measuring means for measuring time period (CLLDLY) from the generation of said closure identificative signal;

first determination means for determining when said measured time period (CLLDLY) has elapsed relative to a predetermined delay period (tKLLDLY), said first determination means generating an idling signal reflective of the engine idling condition when said measured time period (CLLDLY) has elapsed beyond said predetermined delay period (tKLLDLY), and generating a non-idling signal otherwise;

memory means for storing a first ignition timing control program corresponding to the idling condition, and a second ignition timing control program corresponding to the non-idling condition;

means for executing either one of said first or said second ignition timing control programs, in response to said idling signal;

operation detecting means for determining when the engine
is operating, and for generating a detection signal reflective of the start of operation of the engine;

second measuring means for measuring time period (CAST) from the generation of said start of operation signal;

second determination means for determining whether said measured time period (CAST) has reached a predetermined elapsed period of time; and setting means for setting said delay period (tKLLDLY) to a specific fixed value, when said measured time period (CAST) has not reached said predetermined elapsed period of time, and for setting said delay period (tKLLDLY) to a larger value than said specific fixed value, when said measured time period (CAST) has ended beyond said predetermined elapsed period of time.

9. The controller according to claim 8, wherein said specific fixed value is about 50 milliseconds.

10. The controller according to claim 8, wherein said predetermined elapsed period of time used for said second determination means is about three seconds.

* * * * *

UNITED STATES PATENT AND TRADEMARK OFFICE
CERTIFICATE OF CORRECTION

PATENT NO. : 5,277,161
DATED : January 11, 1994
INVENTOR(S) : Kouji ENDOU

It is certified that error appears in the above-indentified patent and that said Letters Patent is hereby corrected as shown below:

Column 2, line 38, change "affect" to --affects--.

Column 3, line 45, change "($\theta$DL)" to --(IDL)--.

Column 4, line 2, change "communicate" to --communicating--.

Column 4, line 60, change "referring" to --referred to--.

Column 4, line 68, change "referring" to --referred--.

Column 5, line 22, between "from" and "other" insert --the--.

Column 5, line 41, change "if" to --it--.

Column 6, line 18, change "a ignition" to --an ignition--.

Column 6, line 60, change "started" to --starting--.

Column 9, line 8, change "becomes" to --thereby becoming--.

UNITED STATES PATENT AND TRADEMARK OFFICE
CERTIFICATE OF CORRECTION

PATENT NO. : 5,277,161
DATED : January 11, 1994
INVENTOR(S) : Kouji ENDOU

It is certified that error appears in the above-indentified patent and that said Letters Patent is hereby corrected as shown below:

Column 9, line 50, delete "and".

Column 9, line 68, change "generating" to --generation of--.

Column 10, line 1, change "occuring an" to --occurence of--.

Column 10, line 7, delete "has".

Column 12, line 31 and 32, "is operating," on line 32, should continue after "engine" on line 31 as one paragraph.

Signed and Sealed this

Ninth Day of August, 1994

Attest:

BRUCE LEHMAN

Attesting Officer

Commissioner of Patents and Trademarks